L. H. FERGUSON.
TIRE.
APPLICATION FILED JAN. 11, 1913.

1,091,316.

Patented Mar. 24, 1914.

Witnesses
Frank Hough
E. Edmondson Jr.

Inventor
Lyman H. Ferguson,
By Victor J. Evans
Attorney

UNITED STATES PATENT OFFICE.

LYMAN H. FERGUSON, OF BUFFALO, NEW YORK, ASSIGNOR OF ONE-THIRD TO WHEELER SMITH, OF ENFIELD, NEW YORK.

TIRE.

1,091,316.  Specification of Letters Patent. Patented Mar. 24, 1914.

Application filed January 11, 1913. Serial No. 741,563.

*To all whom it may concern:*

Be it known that I, LYMAN H. FERGUSON, a citizen of the United States, residing at Buffalo, in the county of Erie and State of New York, have invented new and useful Improvements in Tires, of which the following is a specification.

This invention relates to tires and more particularly to that type which are known in the art as airless or cushion tires. In tires of this type where transverse partitions have been bridged across the body it has been found necessary to provide some means for withdrawing the cores and to this end certain of the cushion tires now on the market have their partition loose from the tire so that the free edges of the body may be opened up to remove the cores. This looseness between the body and the partition causes considerable friction and when the machine is driven at high speed this friction causes extreme heat which blisters the tire thus permitting the ingress of the gravel and water and the deterioration of the tire.

It is the object of this invention to overcome these difficulties and broadly speaking consists in providing a frictionless partition adapted to absorb the shocks received by the tire.

A further object of the invention is to provide a tire having a plurality of partitions so constructed and connected throughout to the walls of the tire so that there will be no friction between the walls and the partition and so that the walls of the tire or body may be spread conveniently to remove the core.

Still another object of the invention is the provision of a tire of this character having a plurality of partitions bridged across the interior of the same and each provided with a vertical slot whose diameter increases as the slot extends inwardly so that compression on the tire will not bring the walls of the slot together whereby friction would be produced, and thus avoiding this objection.

Further objects of this invention will appear as the following specific description is read in connection with the accompanying drawing which forms a part of this application, and in which:—

Figure 1:
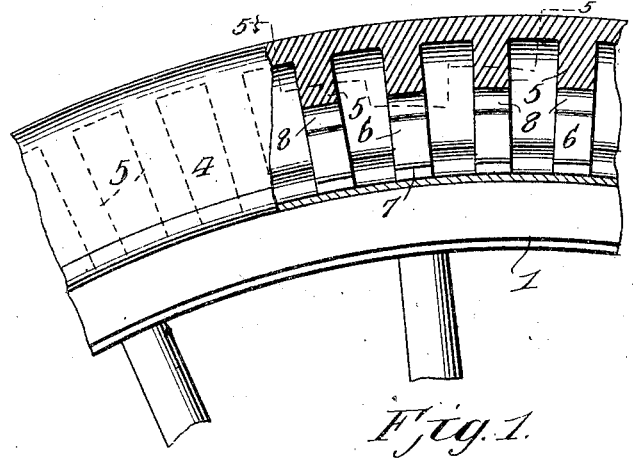
Figure 2:
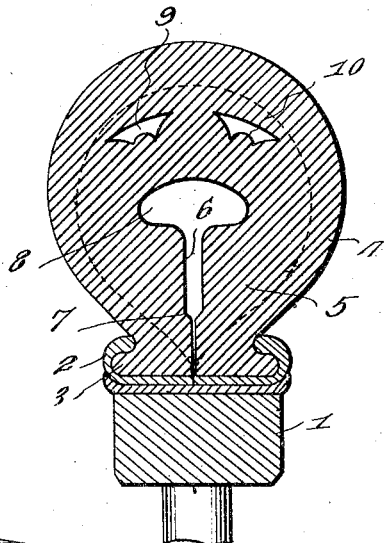
Figure 3:
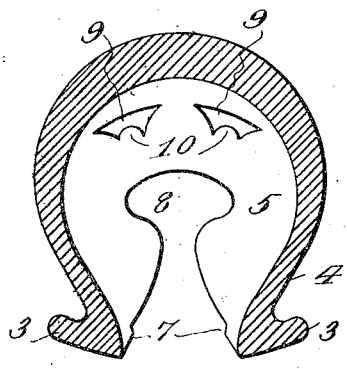
Figure 4:
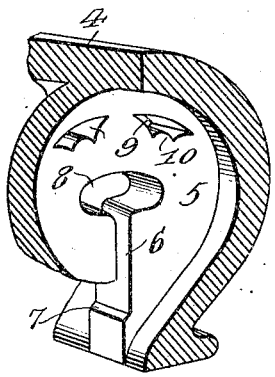
Figure 5:
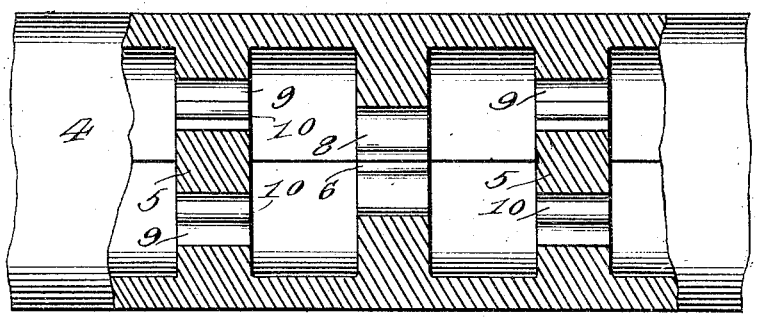

Figure 1 is a fragmentary elevation partly in section. Fig. 2 is a transverse sectional view through one of the partitions of the tire. Fig. 3 is a detail sectional view taken between two of the partitions and showing the walls of the tire partly spread and thus indicating how the core may be removed. Fig. 4 is a fragmentary sectional perspective view. Fig. 5 is a section on the line 5—5 of Fig. 1.

Referring more particularly to the drawing, 1 represents an ordinary wheel felly provided with any suitable type of clencher rim adapted to receive and secure the lateral flanges 3 of the tire body 4 to the felly. This tire body comprises an annular circumferentially split hollow member having a plurality of partitions 5 extending transversely across the interior of the body and connected to the body throughout their entire circumference. Each partition is constructed similarly and may be formed of a somewhat softer or more elastic rubber than that of which the body 4 is formed or they may be constructed of the same quality and type of rubber and the body may be reinforced with inter-embedded layers of a suitable reinforcing fabric. Each partition is split or slotted as shown at 6, the walls of the slot meeting for a distance from the bottom of the tire which is equal or greater than the thickness or depth of the clencher rim. The slots are then widened as shown at 7 so as to have their walls considerably separated and this widened slot merges into an enlarged opening 8 formed approximately in the center of the partition. Immediately above the opening 8 are openings or apertures 9, the lower wall of which is provided with an upward extension or knob 10 which is adapted to engage the upper wall of the opening when the tire is forcibly collapsed so as to assist in carrying the tire back to normal position.

By connecting the partition throughout its circumference to the walls of the tire body there is no relative movement between the partition and the tire body and consequently no friction between these parts to heat up the tire. It will be noticed that upon pressure being applied the walls of the slot 6, or more correctly speaking, the walls of the enlarged or widened portion of the slot 6 will be spread apart instead of being brought together and the walls of said slot where they meet being below the point of bend of the partition and body of the tire and are forced together in a direct transverse line across the tire so that there is no sliding movement between the walls of the slot and consequently no friction is produced in these parts.

What is claimed is:—

A tire comprising an annular hollow body circumferentially split and split partitions extending across the interior to the body and formed integral with the tire throughout their circumferences, said partitions having an enlarged central opening communicating with the split, the walls of said split contacting for a predetermined distance above the base of the partitions and being separated from the contacting portions to the central opening, said partition having openings arranged radially above the central opening, the inner walls of the latter openings being formed to produce outwardly extending lugs adapted to contact with the outer walls when pressure is applied to the tire.

In testimony whereof I affix my signature in presence of two witnesses.

LYMAN H. FERGUSON.

Witnesses:
J. WM. ELLIS,
WALTER H. KELLEY.

Copies of this patent may be obtained for five cents each, by addressing the "Commissioner of Patents, Washington, D. C."